Figure 1:
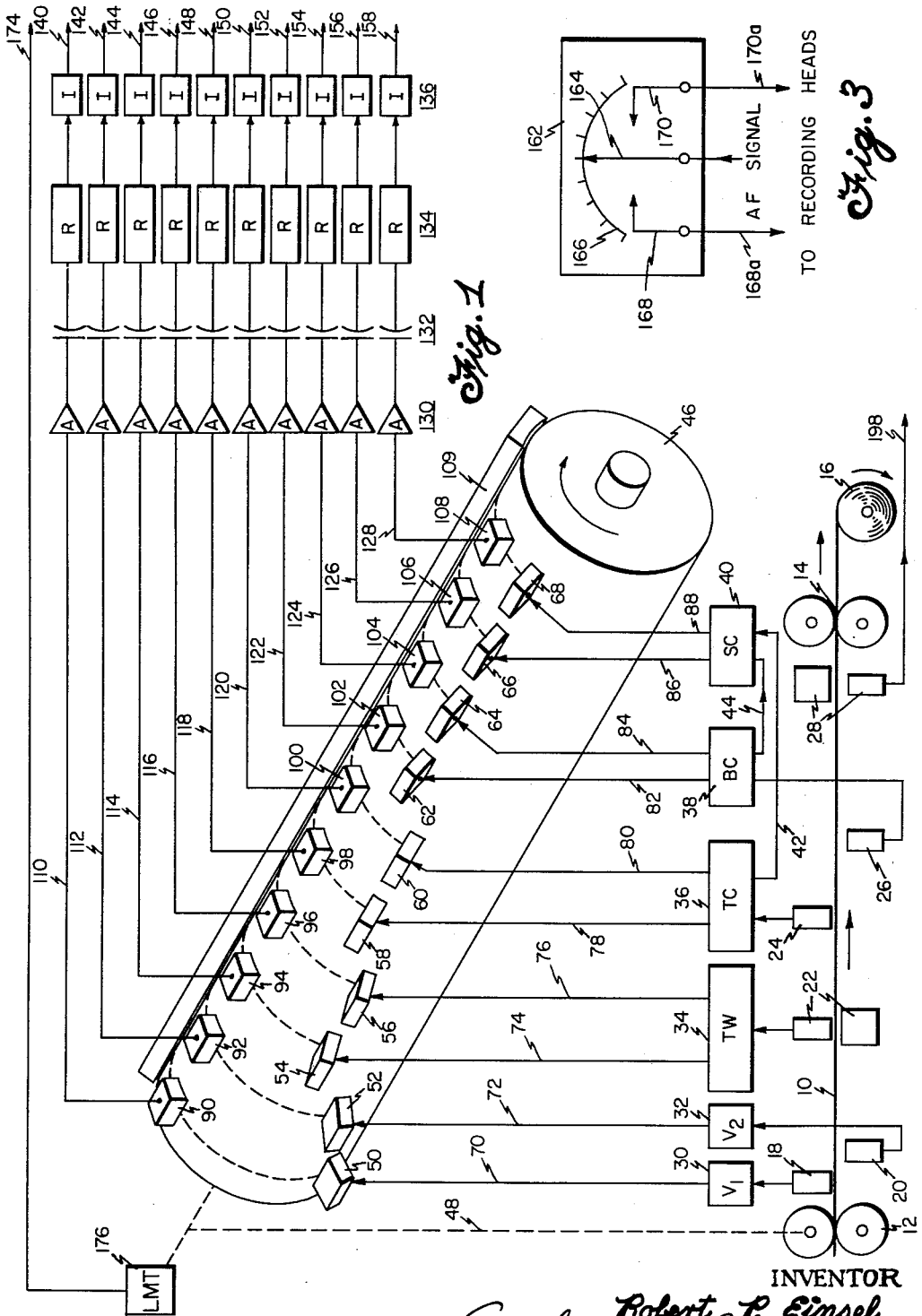

Sept. 12, 1961

R. P. EINSEL 3,000,003

PRODUCT ANALYSIS

Filed Nov. 25, 1957

2 Sheets-Sheet 1

INVENTOR
Robert P. Einsel
By Anthony D. Cennamo

Sept. 12, 1961

R. P. EINSEL 3,000,003

PRODUCT ANALYSIS

Filed Nov. 25, 1957

2 Sheets-Sheet 2

INVENTOR
Robert P. Einsel
By Anthony D. Cennamo

United States Patent Office 3,000,003
Patented Sept. 12, 1961

3,000,003
PRODUCT ANALYSIS
Robert P. Einsel, Columbus, Ohio, assignor to Industrial Nucleonics Corporation, a corporation of Ohio
Filed Nov. 25, 1957, Ser. No. 698,867
12 Claims. (Cl. 340—172.5)

This invention relates to an automatic system for cumulative analysis of a material product, and more specifically it relates to an electronic analyzer adapted to receive signalized data from a plurality of instruments testing said product, to logically evaluate the product in accordance with the data, and totalize the results.

The invention will be illustrated and described in connection with an industrial process producing finished or semi-finished material in a continuous length to be inspected for a plurality of properties by a plurality of specific property-determining instruments, to the end that the quality of discrete portions of the product can be established by the occurrence or non-occurrence of predetermined combinations of these properties in each of such portions thereof. However, such illustration and description is given by way of example only, since the invention also contemplates the application of the principles herein disclosed in connection with many other forms of inspection apparatus; for example, apparatus for performing plural inspections of unit manufactured articles successively delivered to an inspection station by a conveyor, or unit volumes of liquids or gases passing through a pipe line. It is also contemplated that the system of the invention will find utility in connection with inspection procedures wherein, instead of testing different properties, the same property in the same item is retested repeatedly at spaced time intervals separated by changes in the conditions of measurement. For ultimate specificity of example, it is chosen for purposes of illustration to describe an apparatus for analyzing the product of an electroplating line such as a tin plate line.

In the operation of a tin plate line, it was formerly the practice to shear the strip into sheets which were then inspected by manual and/or semi-automatic means. However, the users of tin plate now prefer or even insist that the product be delivered in continuous coils rather than in sheets. Furthermore, many modern electrotinning lines run at such high speeds that the shears and sheet sorters can no longer keep pace with the rate of production of strip. This evolution in the industry does not in any way ease the requirements for comprehensive inspection; on the contrary, such inspection is supremely important not only from the standpoint of quality control but also as a guide to the grading, pricing and eventual utilization of the product.

Among the important properties for which tin plate should be inspected are total strip thickness, top plating thickness, bottom plating thickness, total plating thickness, visual defects top, visual defects bottom, and the presence of pinholes in the strip.

In accordance with this invention as applied to an apparatus for analysis of tin plate production, a plurality of transducers are provided whereby the above properties are automatically tested as the traveling strip passes an inspection station. Each transducer is coupled to an associated measuring apparatus adapted to provide digital signals whenever the property of interest deviates from the norm by a predetermined amount. Inasmuch as these transducers must ordinarily be spaced from each other along the path of travel of the moving strip, the signals are delayed in time by various amounts depending on the spacing of the transducers and the speed of the strip, so that the signals arriving at the analyzer simultaneously represent properties of a common increment or unit length of material. The analyzer has associated therewith a plurality of registers for totaling the number of unit lengths produced, as well as the number thereof containing each of the various deficiencies signaled by the measuring devices. There is further provided in connection with the analyzer a logic section whereby each unit length of material is evaluated on the basis of the combination of properties detected therein. The logic section output is connected to registers wherein each unit length is classified according to any suitable scheme desired by the producer for relating predetermined combinations of properties to established categories of quality.

It is an object of this invention to provide an automatic system for cumulative analysis of a material product.

It is a more specific object to provide an electronic production analyzer whereby the readings of one or a plurality of instruments successively or simultaneously testing individual items may be registered, combined, and logically evaluated in order to achieve high speed automatic classification of a material product.

Figure 2:
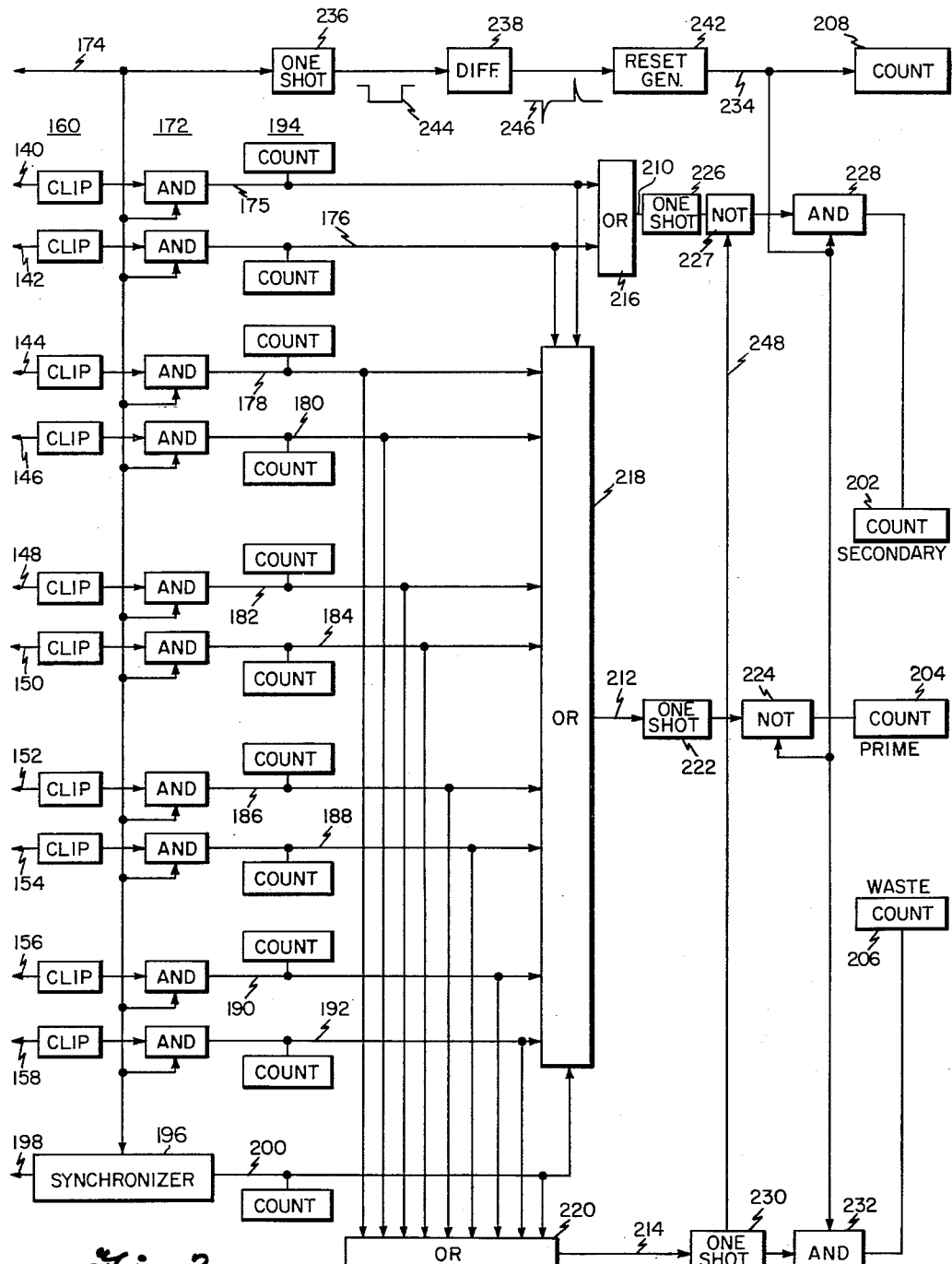

Further objects and advantages of the invention will become apparent in the following detailed description taken in connection with the accompanying drawings, in which:

FIGURE 1 and FIGURE 2, when mutually connected through signal lines 140–158 and 174 and 198, comprise a showing of the delivery section of an industrial processing line, specifically a tin plate line, associated with analyzer apparatus in accordance with the present invention.

FIGURE 3 is a sketch illustrating a simplified method of initiating conversion of instrument readings into digital signals for use in the analyzer of the present invention.

Referring to FIGURE 1, there is shown a strip 10 issuing from an electroplating line and passing through two sets of rolls 12 and 14 for delivery to a coiler 16. Between the two sets of rolls are located a plurality of transducers 18–28. A plurality of measuring instruments 30–38 receive the signal outputs of transducers 18—26 and may convert the same into visual or graphically recorded indications of values of the material properties to which transducers 18–26 are responsive. For example, transducers 18 and 20 and associated instruments 30 and 32 may comprise dual photoelectric inspection apparatus such as is described in U.S. Patent No. 2,753,464, issued July 3, 1956, to Leonard R. Stone, which monitors the upper and lower surfaces of the sheet for the purpose of detecting visual defects such as blotches, discolorations or stains thereon. Transducer combination 22 and instrument 34 may comprise a device such as is described in U.S. Patent No. 2,790,945, issued April 30, 1957, to Henry R. Chope, which is utilized to measure the total thickness of the strip 10. Transducers 24—26 and instruments 36—38 comprise a pair of devices such as are described in a copending application Serial No. 662,672, filed May 31, 1957, by George B. Foster et al., now Patent No. 2,951,161, which devices are utilized to measure the plating thicknesses on the top and bottom sides of the strip 10. The instrument 40 comprises a recording type of summation computer which is connected to instruments 36 and 38 respectively by cables 42 and 44, and which adds the readings of instruments 36 and 38 to indicate the total thickness of plating applied to the top and bottom of the strip 10 in a manner more fully described in a co-pending application, Serial No. 688,720, filed October 7, 1957, by Donald E. Varner, now Patent No. 2,895,888. Transducer 28 may comprise a pinhole detector such as is described in U.S. Patent No. 2,758,712, issued August 14, 1956, to Garrett B. Linderman, and which is designed to deliver a suitable electrical pulse to an external circuit upon the occurrence of a pinhole in the strip passing therethrough.

At 46, shown greatly magnified, is a magnetic storage drum which is driven in suitable speed relation to the linear rate of travel of the strip 10 through a suitable mechanical connection 48 to rolls 12 which are in positive tractive engagement with the strip. Associated with drum 46 are a plurality of axially spaced magnetic recording heads 50–68 connected to instruments 30–40 through lines 70–88. Circumferentially spaced from recording heads 50–68 on the periphery of drum 46 are a plurality of corresponding pick-up heads 90–108 and an eraser unit 109. The pickup heads 90–108 are respectively connected by lines 110–128 to the inputs of a plurality of amplifiers in the group 130. The output of each amplifier is in turn coupled through a capacitor in the group 132 to a bridge rectifier in the group 134. The output of each rectifier is passed through a simple resistance-capacitance integrating circuit in the group 136 to a line in the group 140–158. Referring to FIGURE 2, there is shown a continuation of lines 140–158 terminating in a plurality of clipper circuits indicated in the column thereof headed by the numeral 160. Further description of FIGURE 2 is deferred pending explanation of the functioning of the apparatus of FIGURE 1 and FIGURE 3.

Referring to FIGURE 3, for purposes of apt illustration there is shown a simple meter 162 which may represent the indicating element of any one of instruments 30–40. The meter 162 is provided with a pointer 164 which is electrodynamically movable with respect to an associated scale 166, thereby to indicate the value of the material property detected by the associated transducer or computing device. The pointer 164 also carries a dynamic electrical contact cooperative with a pair of stationary but adjustable limit contacts 168 and 170. Thus while the indicator reading remains within an acceptable range as predetermined by the setting of the limit contacts, the circuits connected to the latter are not energized. However if the indicator reading increases or decreases until a limit contact is made, an audio frequency signal appearing on the dynamic contact is connected to the appropriate line 168a or 170a, whereby the signal may energize the associated recording head in the group 50–68, which in turn records the signal on the rotating storage drum 46.

For convenience of illustration, the pickup heads 90–108 are all shown mounted along a common line parallel to the axis of drum 46, and this line is considered to correspond with a reference point along the path of travel of the sheet 10 in the vicinity of the last transducer 28 in the group 18–28 thereof. Each recording head in the group 50–68 is spaced circumferentially of the drum from its cooperating pickup head according to the distance separating its cooperating transducer from said reference point. Therefore, since the drum 46 rotates in synchronism with the movement of the strip 10, the signal or absence thereof noted by each of the recording heads at any given instant represents a characteristic of the same incremental length of the strip.

An audio frequency signal picked up by one of the recording heads is amplified by its associated amplifier in the group 130; the output of the amplifier in turn being coupled through a capacitor in the group 132 to a bridge rectifier in the group 134. The output of the bridge rectifier is a pulsating D.C. signal which is integrated or filtered by a resistance-capacitance circuit in the group 136. The degree of integration or filtering is necessarily small because of the speed of response required; that is, the time constant selected should be just sufficient to keep the D.C. component of the signal above the clipping level. The output of each clipper in the group 160, FIGURE 2, thus comprises a binary signal signifying acceptability or non-acceptability of a material increment from the standpoint of the property to which the transducer associated with said clipper is responsive. Due to the action of the signal delay system, the outputs of the other clippers in the group simultaneously present other acceptability criteria affecting the same increment.

The outputs of clippers 160 are utilized to provide parallel gating inputs to a plurality of coincidence circuits or AND gates in the column headed by the numeral 172. A second input to all of the AND gates is provided on line 174, which is connected to a linear measurement transducer (LMT) 176. The transducer 176 may include a simple interrupter switch actuated by a cam driven mechanically in suitable speed relation to the movement of rolls 12 which are in tractive engagement with the strip 10, so as to provide a voltage pulse each time a predetermined unit length of the strip passes through the nip of the rolls. The transducer 176 may further include appropriate pulse-shaping circuits to deliver a suitable pulse to line 174 upon each operation of the switch.

Upon the arrival of a unit length indicating pulse on line 174, which is connected to one input of each AND gate in the group 172, certain of these coincidence circuits may be gated on by signals from their associated clipper outputs. As hereinabove explained, the presence of a gating signal indicates a quality deficiency in a material property, whereas the absence of a gating signal indicates quality acceptability thereof. Hence, a pulse occurs on one of lines 175–192 only when a deficiency is present in the unit length of material examined.

Connected to lines 175–192 are a plurality of counters or registers shown in a column headed by the numeral 194. Each of these units registers a cumulative count of the number of unit lengths of material 10 having a particular defect characteristic. By tracing the anterior circuits associated with each counter in turn, it is seen that a pulse on line 175 indicates a visual defect on the top side of the strip, a pulse on 176 a visual defect on the bottom side thereof, on line 178 insufficient total strip thickness, on line 180 an excess total strip thickness, on line 182 an insufficient top plating, on line 184 an excess top plating, on line 186 an insufficient bottom plating, on line 188 an excess bottom plating, on line 190 an insufficient total plating, and on line 192 an excess total plating.

Since the occurrence of pinholes as detected by transducer 28 is a more rapid transient phenomenon, special circuitry incorporating the synchronizer 196 is utilized in the handling of pinhole signals, in a manner fully described in a co-pending application Serial No. 692,490, filed October 25, 1957, by Robert P. Einsel and Philip Spergel. Inasmuch as the pinhole detector 28 is the last transducer in line, the delays of the signals provided by the other transducers are arranged with reference to the synchronizer output; the pinhole detector signals being coupled directly to the synchronizer input through line 198.

The synchronizer 196 is operative to monitor the arrival of pinhole pulses on line 198, and when a length measurement pulse appears on line 174 the synchronizer will instantaneously generate a pulse on line 200 if a pinhole has occurred in the unit length of material whose passage is signaled by the pulse on line 174. The output pulses from the synchronizer are successively counted by the last register in the group 194 thereof.

The exemplary apparatus shown also includes classifying registers 202, 204, and 206 as well as a total length register 208. In this particular arrangement, it is desired to classify the material produced into three mutually exclusive categories; specifically, prime stock, secondary stock, and waste stock. To this end, the operation of registers 202-206 is controlled by the logical network comprising the remainder of FIGURE 2 to be described.

It is postulated that prime stock shall contain no defects; that stock having visual defects but no other defects shall be classified as secondary stock, and that stock which is irregular in total thickness, bottom or top plating, total plating or containing pinholes shall be classified as waste. Accordingly, there are provided three lines 210, 212, and 214 headed respectively by the OR gates 216, 218, and 220. The OR gate 216 has two inputs connected to lines 175 and 176. The OR gate 218 has eleven inputs connected to lines 175-192 as well as line 200. The OR gate 220 has nine inputs connected to lines 178-192 as well as line 200.

The OR gate 218 together with a one-shot multivibrator 222 and NOT gate 224 comprises an exclusion circuit. The OR gate 216, a one-shot multivibrator 226, a NOT gate 227, and AND gate 228 comprise a dual function circuit for either exclusion or acceptance. The OR gate 220, a one-shot multivibrator 230 and AND gate 232 comprise an acceptance circuit. Trigger pulses to be accepted or excluded by gates 224, 228 and 232 appear on line 234, which comprises the second input to each of the three gates. These trigger pulses are obtained through the agency of a one-shot multivibrator 236, a differentiating circuit 238, and a reset generator 242. These circuits are activated by the length measurement pulse on line 174 which triggers multivibrator 236. The multivibrator output pulse 244 is differentiated by circuit 238 and the trailing portion of the differentiated pulse 246 is used to trigger reset generator 242 which provides a high, narrow pulse on line 234 which may be termed a "registration pulse" and which comprises the trigger input to gates 224, 228 and 232 as well as the total length counter 208. It is apparent that the registration pulse on line 234 comprises a reshaped version of the pulse on line 174 which has been delayed for a period of time determined by the length of the rectangular pulse 244 provided by one-shot multivibrator 236.

In operation, when a length measurement pulse arrives on line 174 and none of lines 140-158 has a gating signal (defect indication) thereon, no pulse will be propagated onto lines 175-192. If furthermore no pulse appears on line 200 at the output of the synchronizer, the length of material whose passage has been signaled by the pulse on line 174 is classified as prime stock when the delayed registration pulse on line 234 is passed by the NOT gate 224 to trigger the counter 204. On the other hand, the absence of a gating signal on AND gates 228 and 232 prevents the registration pulse from triggering counters 202 or 206.

If a visual defect gating signal is present on line 140 or 142 when a length measurement pulse arrives on line 174, the associated AND gate will propagate a pulse onto line 175 or 176. This pulse will be passed by both OR gates 216 and 218, triggering multivibrators 222 and 226, which in turn respectively provide gating signals to the NOT gate 224, and, via the NOT gate 227, to the AND gate 228. Both multivibrators 222 and 226 provide pulses of longer duration than multivibrator 236, so as to hold the gating signals until the delayed registration pulse arrives on line 234. Thereupon the AND gate 228 passes the registration pulse to the secondary stock counter 202, while the NOT gate 224 prevents operation of the prime stock counter 204. Similarly, in another instance, if a defect indicating signal is present on one or more of lines 178-192 and/or line 200, OR gates 218 and 220 will trigger multivibrators 222 and 230, which in turn respectively provide gating signals to the NOT gate 224 and the AND gate 232. On arrival of the registration pulse on line 234, the AND gate 232 passes the registration pulse to the waste stock counter 206, while the NOT gate 224 prevents operation of the prime stock counter 204.

It is the purpose of the NOT gate 227 to prevent an increment of material containing both a visual defect and another defect from tripping both registers 202 and 206. It will be apparent that the passage of such a length of material will result in simultaneous gating signals at the outputs of all three of multivibrators 222, 226 and 230. Accordingly the NOT gate 224 will prevent actuation of the prime register 204 as above explained. In addition, since a gating output of multivibrator 230 is applied to the disabling input 248 of the NOT gate 227, the output of multivibrator 226 is unable to provide its gating signal to AND gate 228. Hence only the other AND gate 232 may trigger its associated register; that is, the waste counter 206.

It must be emphasized that due to the nature of the present invention the particular combination of elements herein illustrated and described has an extremely wide range of equivalents. For example, the arrangement of transducers can be varied in a number of ways. In the case mentioned hereinabove of a single transducer repeatedly testing the same characteristic of an item so as to evaluate different properties thereof determined by changes in the conditions of measurement, a suitable known type of multiplexing switch, not requiring illustration herein, may be used to route the output of the instrument successively to the various signal lines as at 70-88 of FIGURE 1. Several other different types of transducers singly, in combination with each other, or in combination with one, several, or all of those described, in a plurality of different arrangements may be used to detect the same or other properties or combinations of properties in either the materials or objects herein described and indicated or other materials and objects. Similarly, a number of other different or similar known types of delay means can be utilized. Many other known schemes for digitizing, converting, or otherwise processing the information provided by the transducers or computers may be used. It is immaterial whether portions of the input information are delayed first and then converted to binary code or vice versa, or whether portions of these operations are intermingled as is the case with the system of FIGURE 1 and FIGURE 3. Different arrangements of the logic section are made necessary by the requirements of different processes or tests. Indeed, it is quite likely that different users of the system of the invention may desire different classification arrangements utilizing identical data. All such changes, modifications and equivalents are therefore considered to fall within the scope of the invention as is set forth in the appended claims.

What is claimed is:

1. Electronic apparatus for classifying items of a material product into a plurality of categories determined by arbitrarily chosen combinations of properties possible of occurrence in a given item, comprising a plurality of signal lines, at least one such line corresponding to each property in said combinations, means for testing an item for each property in said combinations; said testing means including a plurality of means for generating electrical signals upon the occurrence of each property in said item, at least one of said signal generating means including means for measuring a physical characteristic of said product, means associated with said measuring means for generating a voltage analog of variations in said measured characteristic, and means for generating a signal whenever said voltage analog varies beyond selected limits; means for routing each of said signals onto the signal line corresponding to that property being tested when said signal is generated; a first plurality of gates, one such gate corresponding to each of said signal lines, each gate having a trigger input terminal, a control input terminal connected to its corresponding signal line, and an output controlled by the presence of signals on both said input terminals simultaneously; means for generating a signal simultaneously applied to all said trigger input terminals when all tested properties of an item have been tested, groups of said gate outputs, each group including the outputs of those gates connected to signal lines corresponding to properties in one of said combinations; a second plurality of gates, each gate of said second plurality thereof corresponding to one of said groups and having a connection to each output in said group, for propagating a signal received on any of said connections, and a plurality of indicating means, each corresponding to one gate of said second plurality of gates and each responsive to said propagated signals from its respective gate for indicating the category of an item in accordance with a specific combination of properties therein.

2. Apparatus as in claim 1 wherein said testing means comprises a plurality of measuring instruments, and wherein said routing means comprises parallel connections of said instruments to said signal lines.

3. Apparatus as in claim 2 including means for subjecting an item to certain of said instruments seriatim, and wherein at least one of said signal lines includes means for delaying a signal thereon at least pending generation of a signal by the last seriate instrument.

4. Apparatus as in claim 1 wherein said testing means comprises a single measuring instrument retesting said item at a discrete number of spaced intervals, wherein said routing means comprises switch means for connecting said instrument generated signals to each of said signal lines seriatim, and wherein at least one of said signal lines includes means for delaying a signal thereon at least pending the generation of a signal on the last seriate signal line.

5. Electronic apparatus for classifying items of a material product into a plurality of mutually exclusive categories determined by arbitrarily chosen combinations of properties possible of occurrence in a given item, at least one of said properties being included in at least two of said combinations; said apparatus comprising a plurality of signal lines, at least one such line corresponding to each property in said combinations, means for testing an item for each property in said combinations, said testing means including means for generating electrical signals upon the occurrence of each property in said item, means for routing each of said signals onto the signal line corresponding to that property being tested when said signal is generated; a first plurality of gates, one such gate corresponding to each of said signal lines, each gate having a trigger input terminal, a control input terminal connected to its corresponding signal line, and an output controlled by the presence of signals on both said input terminals simultaneously; means for generating a signal simultaneously applied to all said trigger input terminals when all tested properties of an item have been tested, groups of said gate outputs, each group including the outputs of those gates connected to signal lines corresponding to properties in one of said combinations; a second plurality of gates, each gate of said second plurality thereof corresponding to one of said output groups, and having a connection to each output in said group, for providing an activating pulse when a signal is received on any of said connections; a plurality of gating signal generator means, each generator corresponding to one of said second plurality of gates and each triggered by said activating pulses from its respective gate, for producing gating signals having a first time duration; a NOT gate having a trigger input terminal connected to an output of one of said gating signal generator means, a disabling input terminal connected to an output of another of said signal generator means, and an output providing a further gating signal; means responsive to said signal simultaneously applied to all said trigger input terminals for generating a registration pulse, means for delaying said registration pulse for a second time duration not greater than said first time duration; a third plurality of gates, each gate of said third plurality thereof having a trigger input receiving said delayed registration pulse, a control input terminal receiving one of said gating signals, and an output; and a plurality of indicating means, each corresponding to one gate of said third plurality of gates and each responsive to the output of its respective gate for indicating the category of an item in accordance with a specific combination of properties therein.

6. Apparatus as in claim 5 wherein said testing means comprises a plurality of measuring instruments, and wherein said routing means comprises parallel connections of said instruments to said signal lines.

7. Apparatus as in claim 6 including means for subjecting an item to certain of said instruments seriatim, and wherein at least one of said signal lines includes means for delaying a signal thereon at least pending generation of a signal by the last seriate instrument.

8. Apparatus as in claim 5 wherein said testing means comprises a single measuring instrument retesting said item at a discrete number of spaced intervals, wherein said routing means comprises switch means for connecting said instrument generated signals to each of said signal lines seriatim, and wherein at least one of said signal lines includes means for delaying a signal thereon at least pending the generation of a signal on the last seriate signal line.

9. Electronic apparatus for classifying items of a material product into a plurality of mutually exclusive categories determined by arbitrarily chosen combinations of properties possible of occurrence in a given item, at least one of said combinations consisting of the absence of all said properties; said apparatus comprising a plurality of signal lines, at least one such line corresponding to each property in said combinations, means for testing an item for each property in said combinations, said testing means including means for generating electrical signals upon the occurrence of each property in said item, means for routing each of said signals onto the signal line corresponding to that property being tested when said signal is generated; a first plurality of gates, one such gate corresponding to each of said signal lines, each gate having a trigger input terminal, a control input terminal connected to its corresponding signal line, and an ouptut controlled by the presence of signals on both said input terminals simultaneously; means for generating a signal simultaneously applied to all said trigger input terminals when all tested properties of an item have been tested, groups of said gate outputs, each group including the outputs of those gates connected to signal lines corresponding to properties in one of said combinations; a second plurality of gates, each gate of said second plurality thereof corresponding to one of said output groups, and having a connection to each output in said group, for providing an activating pulse when a signal is received on any of said connections; a plurality of gating signal generator means, each generator corresponding to one of said second plurality of gates and each triggered by said activating pulses from its respective gate, for producing gating signals having a first time duration; means responsive to said signal simultaneously applied to all said trigger input terminals for generating a registration pulse, means for delaying said registration pulse for a second time duration not greater than said first time duration; a third plurality of gates, each gate of said third plurality of gates having a trigger input terminal receiving said delayed registration pulse, a control input terminal receiving one of said gating signals, and an output, at least one of said third plurality of gates comprising a NOT gate wherein said control input terminal is a disabling input; and a plurality of indicating means, each corresponding to one gate of said third plurality of gates and each responsive to the output of its respective gate for indicating the category of an item in accordance with a specific combination of properties therein.

10. Apparatus as in claim 9 wherein said testing means comprises a plurality of measuring instruments, and wherein said routing means comprises parallel connections of said instruments to said signal line.

11. Apparatus as in claim 10 including means for subjecting an item to certain of said instruments seriatim, and wherein at least one of said signal lines includes means for delaying a signal thereon at least pending generation of a signal by the last seriate instrument.

12. Apparatus as in claim 9 wherein said testing means comprises a single measuring instrument retesting said item at a discrete number of spaced intervals, wherein said routing means comprises switch means for connecting said instrument generated signals to each of said signal lines seriatim, and wherein at least one of said signal lines includes means for delaying a signal thereon at least pending the generation of a signal on the last seriate signal line.

References Cited in the file of this patent

UNITED STATES PATENTS

| | | |
|---|---|---|
| 2,138,645 | Rey | Nov. 29, 1938 |
| 2,674,727 | Spielberg | Apr. 6, 1954 |
| 2,793,344 | Reynolds | May 21, 1957 |
| 2,798,667 | Spielberg | July 9, 1957 |
| 2,876,437 | Johnson | Mar. 3, 1959 |